United States Patent [19]
Lin

[11] Patent Number: 5,275,869
[45] Date of Patent: Jan. 4, 1994

[54] HEAT RAY REFLECTING GLASS STRUCTURE HAVING HIGH HEAT INSULATION, HIGH LUMINOSITY AND MONODIRECTIONAL REFLECTIVITY

[76] Inventor: Chii-Hsiung Lin, No. 55, Dai Jen Street, Kaohsiung, Taiwan

[21] Appl. No.: 898,264

[22] Filed: Jun. 15, 1992

[51] Int. Cl.⁵ .............................................. B32B 9/00
[52] U.S. Cl. .................................. 428/195; 428/206; 428/210; 428/415; 428/426; 428/432; 428/433; 428/434
[58] Field of Search ............... 428/433, 432, 206, 195, 428/434, 426, 415, 210; 52/171

[56] References Cited
U.S. PATENT DOCUMENTS 4,382,995 5/1983 Lin .................................. 428/415
5,030,503 7/1991 Carter et al. ...................... 428/195

Primary Examiner—Patrick J. Ryan
Assistant Examiner—Abraham Bahta
Attorney, Agent, or Firm—Lowe, Price, LeBlanc & Becker

[57] ABSTRACT

The present invention provides a heat ray (infrared) reflecting glass structure of the type composed of two sheets of transparent plate glass substrates with same size, wherein a metal or metallic oxide heat ray reflecting material coating layer with desired color is coated on the inner surface of the outdoor-facing plate glass substrate, and a black or gray printing ink coating layer having orderly intercrossing stripes or net configuration composed of circle or hexagon patterns is further coated or printed on said metal or metallic oxide coating layer; then said outdoor-facing plate glass substrate and the other plate glass substrate are laminated with an intermediate adhesive layer to become a laminate structure which renders most sunlight reflected and only a portion of it will pass through the crevices without reflecting material and printing ink coating into indoor and is characterized in high heat insulation, high luminosity, no duplicated virtual image or no distorted static image.

8 Claims, 2 Drawing Sheets

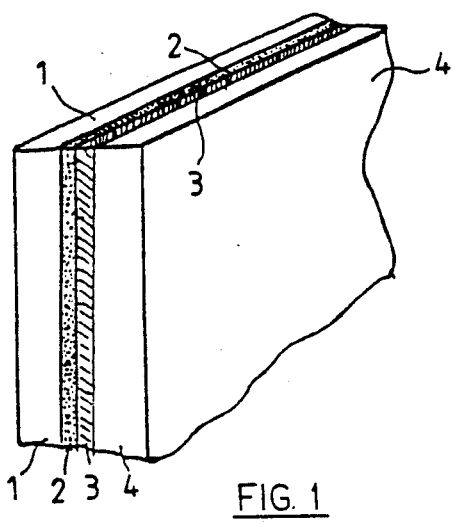
FIG. 1
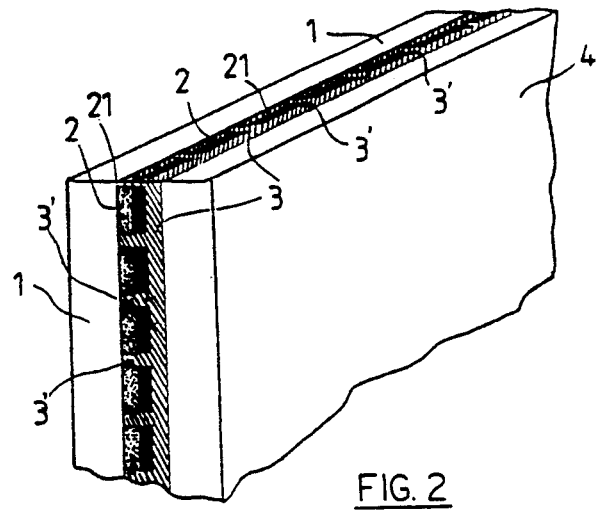
FIG. 2
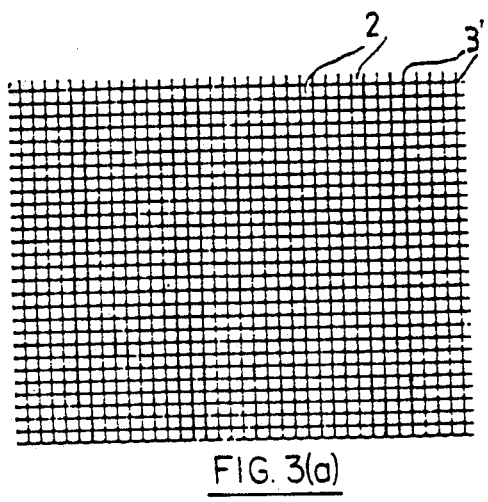
FIG. 3(a)
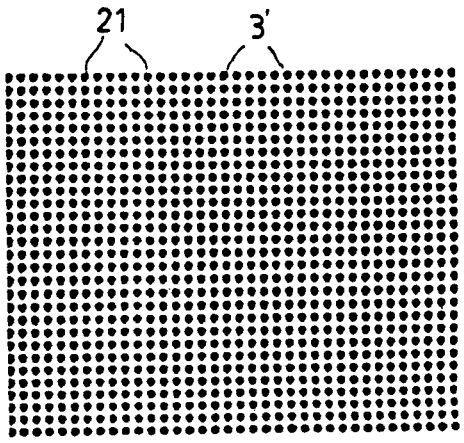
FIG. 3(b)
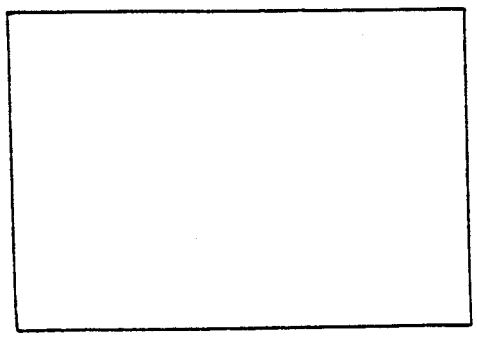
FIG. 3(a')
FIG. 3(b')

HEAT RAY REFLECTING GLASS STRUCTURE HAVING HIGH HEAT INSULATION, HIGH LUMINOSITY AND MONODIRECTIONAL REFLECTIVITY

BACKGROUND OF THE INVENTION

This invention relates to a novel improvement in the structure of conventional transparent heat ray (infrared) reflecting glass with high heat insulation, high luminosity and monodirectional reflection while eliminating the duplicated virtual images or distorted static image often seen on the inner surface of conventional heat ray reflecting glass. Conventional heat ray reflecting laminated safety glass, widely used for the curtain walls of buildings, are made by using strong adhesives to laminate together two sheets of plate glass substrate having a desired thickness into a laminate structure wherein on the inner surface of the first outward-facing transparent or colored plate glass substrate is reflective film-treated, plated or coated with a metal or metallic oxide heat ray reflecting layer by conventional methods such as vacuum deposition, electroless plating or thermal decomposition, oxidization and the other second plate may be polyester or polycarbonate plate depending upon the particular applications.

The reflecting rate of conventional metal or metallic oxide reflecting film coated on the inner surface of the aforesaid outer plate glass substrate is generally about 12% to 50%, and the polymeric resin laminating adhesive layer in-between the two substrates is about 0.01 to 3 m/m in thickness, so the glass of curtain walls become mirror-like when viewed from the outside of the building. However, since the glass sheet and resin adhesive layer possess different reflecting rates of 1.52 and 1.48 to 1.6 respectively, a daze or visual compression will usually arise from the duplicated virtual image or distorted static image brought out by the discrepancy of reflective indices among materials of different densities and the uneven surface of glass sheets when produced. This phenomenon will especially deteriorate further when outdoors is brighter than indoors or the intermediate adhesive layer is thicker. Such adverse on the human eye have in the past been relieved only by using dark-colored heat-absorbing glass for the inner plate glass substrate to reduce or cover indoor images on the reflecting film or the dazzling lights; another words, there is not yet another effective means for overcoming or solving such disadvantages as the above-mentioned duplicated virtual image on conventional heat ray reflecting laminated safety glass.

Currently the transparency rate is maintained within the range of 40% to 8% for interior lighting while the heat ray reflecting rate is within the range from 12% to 50%. Accordingly, in addition to aforementioned disadvantages, the transparency rate for luminosity decreases as the reflecting rate of the metal or metallic oxide layer is increased to more than 50% even though more energy for air conditioning is saved as a result of fewer solar rays passing through. It therefore, becomes a most critical issue for those skilled in the art to find a way to obtain a more satisfactory reflecting rate as well as a transparency rate that are indirectly proportional to each other.

SUMMARY OF THE INVENTION

It is one object of the present invention to provide a heat ray reflecting glass which has a high monodirectional reflection, high heat insulation and high luminosity with a reflecting rate and a transparency rate as high as 84% and 65%, respectively, and which can be optionally adjusted depending upon various uses.

Another object of the present invention is to provide a heat ray reflecting glass without a duplicated virtual image or a distorted static image on the inner surface of the glass.

A further object of the present invention is to provide a heat ray reflecting glass having an intermediate adhesive layer with thickness up to 50 m/m, increased safety tightness, penetration resistance, and hight net crack.

Still another object of this invention is to provide a glass having an intermediate adhesive layer which may be admixed with ultraviolet absorbents for absorbing ultraviolet rays, or have embedded in it metallic wire or net making it theft-proof or explosion-proof, or a glass in which a colored glass or decorated polyester or polycarbonate plate is employed on an inner side glass to match with interior decoration.

Still a further object of this invention is to provide a heat ray reflecting glass offering a high level of privacy, variety, and light-eliminated diffusion, as well as allowing high production rates with low defect level.

DETAILED DESCRIPTION OF THE INVENTION

According to the present invention, a conventional heat ray reflecting laminated safety glass is improved by laminating an outward-facing sheet of plate glass substrate coated or plated on its inner side with a heat ray reflecting metal or metallic oxide coating layer and another inward-facing sheet of the same kind of plate glass substrate with an intermediate adhesive into a laminate structure. Such a light transmission monodirectional heat ray reflecting glass structure is characterized in essence in that the heat ray reflecting metal or metallic oxide layer coated on the inner surface of the aforementioned outside glass is over printed by conventional screen printing or is coated with a black or gray printing ink coating having intercrossing stripes or a net configuration composed of circle or hexagon patterns, after said printed ink coating layer has dried, metal or metallic oxide coating coated or plated on the plate glass substrate that has not been covered by printing ink is removed by conventional electro-dissociation or washed by acid to obtain a said glass structure comprised of a heat ray reflecting metal or metallic oxide layer and a printing ink coating layer both having indicated patterns of intercrossing stripes or a net configuration and a coating-free reflectiveless crevice portion, which crevices are filled with adhesive during processing).

As indicated above, said printing ink coating layer according to this invention is placed between the metal or metallic oxide coating layer with mirror-reflecting effect and the intermediate adhesive layer, which acts as a wall separating the glass structure of the invention into a monodirectional outward-reflecting mirror part and an inward-reflectiveless laminated glass part. Thus, the outward-facing glass becomes a monodirectional fully-reflecting mirror by changing the ratio of the sizes of the patterns of intercrossing stripes or net configuration to the crevice portion without coating, such as 9:1, 6.5:3.5 or 5:5; that is, the heat insulation and transparency may be optionally adjusted according to the desired use in a range of 84.5% to 6% for the heat reflecting rate and 3% to 65% for the transparency rate. Nonreflected light will pass through said crevices without reflecting coatings within the metal or metallic oxide and printing ink coating layers. There will therefore be no duplicated virtual images or distorted static images when the glass is looked through from the inside and the interior will be brightly illuminated by light which has passed through the glass is abundant; the adhesive layer may be thickened up to about 50 m/m which is 30% more safe than conventional single sheet glass with some thickness as that of this invention, and the penetration resistance and high net crack as well as anti-rumble will approach 100% while its thickness is 50 m/m. In addition, the outward-facing glass may be lightly eliminated by a treatment having said intercrossing stripes or net configuration so an object will not be reflected, thus rendering greater indoor privacy. Furthermore, the adhesive may be ad-mixed with ultraviolet absorbent to absorbing ultraviolet light rays or embedded with steel wires or nets to make the glass more explosion-proof and theft-proof than conventionally used.

The present invention is illustrated in detail by the following diagrams and embodiments. They are intended to be illustrative but not limiting. Various modifications, alternatives, and improvements should become apparent to those skilled in the art without departing from the spirit and scope of the invention.

DESCRIPTION OF THE DRAWINGS

FIG. 1 shows a cross-sectional view of the structure of a conventional heat ray reflecting laminated safety glass, in FIG. 2 shows an enlarged cross-sectional view of a reflecting and printing ink layer having a pattern of intercrossing stripes or a net configuration comprised of solid circles or hexagon shapes.

FIG. 3 shows a perspective view of an embodiment of this invention consisting of circles and spots viewed from outside and inside.

FIGS. (a) and (b) of FIG. 3 show the heat ray reflecting glass structure of this invention.

Figure 4A:
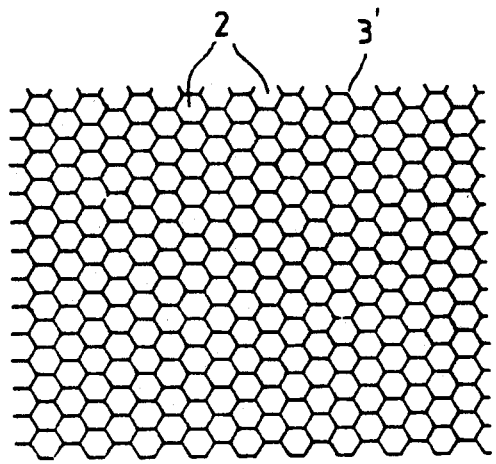
Figure 4B:
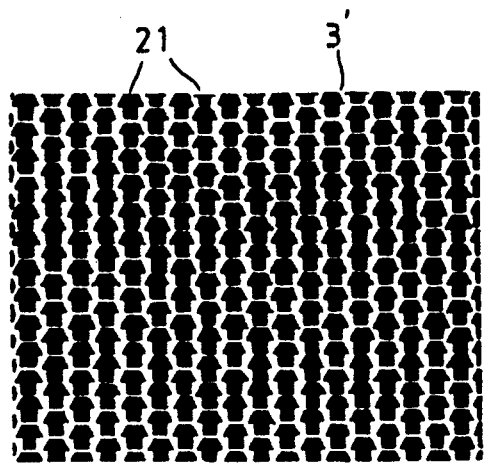

FIGS. 4(a)-(b) show a view of the hexagon patterns employed in this invention when viewed from inside as well as outside, which is substantially the same as FIG. 3.

Figure 5:
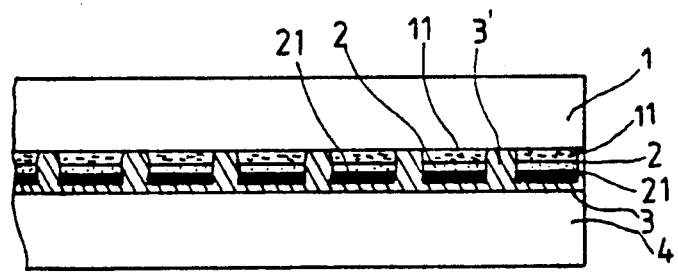

FIG. 5 shows an enlarged cross-sectional view of second embodiment of this invention.

Figure 6:
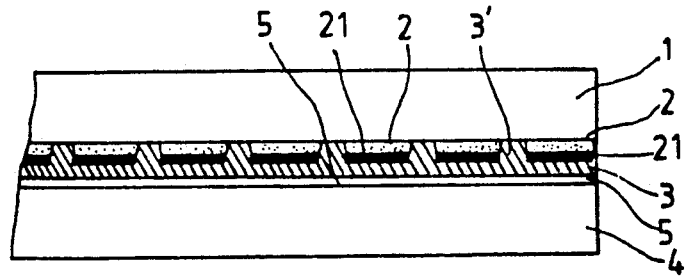

FIG. 6 shows an enlarged cross-sectional view of third embodiment of this invention.

DETAILED DESCRIPTION OF THE DRAWING

The conventional heat ray reflecting laminated safety glass in FIG. 1 consists of two sheets of plate glass substrate, one sheet of glass 1 to be exposed on the outside of a building and a second sheet of glass 4 to be exposed to the inside of a building. The inner side of plate 1 is conventionally coated or plated by a heat ray reflecting metal or metallic oxide layer and an intermediate adhesive layer is adhered thereto. The structure of said glass is a multiple layer of glass consisting of a transparent or light-colored plate glass substrate 1 facing outward a photo-transmission heat ray reflecting metal or metallic oxide coating layer 2 coated or plated in advance on the inward side of the aforesaid outward-facing plate glass substrate 1; an intermediate laminate resin adhesive layer 3 in between the two plate glass substrates; and a plate glass substrate 4 which may be transparent or a dark-colored heat ray absorbing glass facing inward.

In practical use the reflecting rate is in the range of 12% to 50% and the transparency rate is 40% to 8% due to the limitations of composition and processing; therefore, the higher the heat insulation, the lower the luminosity and vice versa, and the occurrence of such problems as the appearance of duplicated virtual images or distorted static images.

According to FIG. 3, FIG. 3(a) consists of circles or spots of metal or metallic oxide mirror-reflective coating layer having a pattern of intercrossing stripes shown on the outward-facing surface of plate glass substrate 1 and a transparent portion of crevices 3' (represented by the black lines shown on the drawing) without the abovementioned coating having reflecting printing ink patterns, which is in fact a monodirectional mirror-reflecting diagram with transparent lines when viewed under the condition that the surfaces of the two sheets of glasses are subject to the same luminosity. On the contrary, (a) would be a plain mirror without transparent lines as (a') provided that brightness differs when viewed from outside. FIG. 3(b) is a perspective view of the black or gray printing ink coating layer having patterns of intercrossing stripes consisting of circles or spots on the inward-facing plate glass substrate, wherein the black or gray printing ink coating 21 and the white-colored portion 3' corresponds to the black lines of 3(a) which represent the transparent crevice portion without the coating of reflecting printing ink patterns. The rays thus pass through and outdoorviews as shown in FIG. 3(b) may be seen through such transparent crevices when viewed from inside.

According to FIG. 4, wherein FIG. 4(a), which is in fact a figure of a monodirectional reflecting mirror with transparent lines (represented by the black lines on the drawing), reveals a metallic oxide mirror-reflecting coating layer 2 having a net configuration composed of hexagon patterns and a portion of transparent crevices without said coating layer on the surface of outward-facing plate glass substrate 1. FIG. 4(b) shows a white-colored net configuration 3' and the black or gray printing ink coating 21 on an inward-surface plate glass substrate 4.

EXAMPLE 1

An embodiment of the present invention (FIG. 2 to 4) consists of outward-facing transparent plate glass substrate 1 which can be either a general or heat-treated reinforced glass of sodium calcium silicates or reinforced glass of sodium or potassium iron exchange; the metal or metallic oxide plating or coating layer 2 having orderly intercrossing stripes or a net configuration composed of solid circles or hexagons patterns, which has a heat ray reflecting effect, is first plated or coated with a desired color layer by conventional methods such as electroless plating, vacuum deposition, or thermal decomposition oxidization in which the plating or coating layer is selected from gold, silver, platinum, copper, tin, zinc, chromium, titanium, aluminum or nickel or an alloy or an oxide thereof and has a thickness ranging from 400 Å to 1800 Å; a black or gray printing ink coating layer 21 printed or coated on reflecting metal or metallic oxide coating layer 2 having intercrossing stripes or net configuration composed of solid circles. The printing ink used can be made of either a polyvinyl butyral resin, urethane resin, epoxy resin or methyl acrylate resin or a mixture thereof from 0.04 m/m to 0.18 m/m in thickness; light-transmission crevices 3' filled with an adhesive, selected from either a methyl acrylate resin adhesive, two-component epoxy resin adhesive, urethane resin adhesive, one-component ultraviolet-sensitized curing adhesive, or one-component heating curing adhesive; wherein said printing ink coated layer 21 is laminated between transparent plate glass substrate 1 and inward-facing plate glass substrate 4. The reflecting rate of the above composition is about 60% for FIG. 3 and 75% for FIG. 4 and the transparency rate is about 30% for FIG. 3 and 15% for FIG. 4.

EXAMPLE 2

A second embodiment of the present invention (FIG. 5) consists of a heat ray reflecting glass structure the same as that in Example 1, except that a light-eliminating layer with the same patterns as 2 or a light-passable, light-colored or dark-colored layer with patterns 11 is placed or sprayed on the surface abutting against the coating or plating layer 2 of transparent plate glass substrate 1.

Layer 11 is light-eliminating by sanding or chemical-treating to obtain a diffuse mirror without reflection on the surface of outward-facing glass or sprayed with a light-passable, light-colored or dark-colored layer having patterns corresponding to those on coating layers 2 and 3 so that outside images are reflected but the glass can be seen through.

EXAMPLE 3

A third embodiment of the present invention (FIG. 6) is identical to the embodiment of FIG. 2 in the arrangement of coating layer 2, printing ink coating layer 21 and adhesive layer 3 on the substrate 1 except that adhesive layer 3 and inward-facing glass substrate 4 is selectively adapted to be colored and a transparent reflecting film is placed between adhesive layer 3 and dark gray inward-facing plate glass substrate 4 or before coating or plating layer 2. Thus, besides the abovementioned advantages, the heat insulation effect of the heat ray reflecting glass composition is higher besides.

What is claimed is:

1. A heat ray reflecting glass structure, comprising
   a) a patterned coating layer comprising a pattern selected from the group consisting of circles and hexagons coated on the inner surface of an outward-facing transparent plate glass substrate, the patterned coating layer being formed from a material selected from the group consisting of metals and metal oxides;
   b) a black or gray printing ink layer having the same pattern as the coating layer (a) and coated on the pattern of the coating layer (a); and
   c) light-passable or transparent crevices on the inner surface of the outward-facing transparent plate glass substrate which are free of the coating layer (a) and the printing ink layer (b).

2. A heat ray reflecting glass structure according to claim 1, wherein the coating layer (a) is selected from the group consisting of gold, silver, platinum, copper, tin, zinc, chromium, titanium, aluminum, nickel, alloys thereof, and oxides thereof, and wherein the coating layer (a) is from 400 Å to 1800 Å in thickness.

3. A heat ray reflecting glass structure according to claim 1, wherein the printing ink layer (b) is formed of a material selected from the group consisting of polyvinyl butyral resin, urethane resin, epoxy resin, methyl acrylate resin, and mixtures thereof and wherein the printing ink layer (b) is from 0.04 mm to 0.18 mm in thickness.

4. A heat ray reflecting glass structure according to claim 1, wherein the printing ink layer is embedded between the coating layer (a) and an adhesive layer, whereby said outward-facing glass is a monodirectional reflecting mirror and said indoor-facing glass is without reflection.

5. A heat ray reflecting glass structure according to claim 1 wherein the size ratio of the pattern of the coating layer (a) and printing ink layer (b) to the crevices is selected from the group consisting of 9/1, 6.5/3.5, and 5/5 to provide a reflecting rate ranging from 84% to 6% and a transmittance rate ranging from 3% to 65%.

6. A heat ray reflecting glass structure according to claim 4, wherein the thickness of the adhesive layer is not greater than 50 mm.

7. A heat ray reflecting glass structure according to claim 4, wherein the adhesive layer includes an ultraviolet absorbent.

8. A heat ray reflecting glass structure according to claim 4, wherein the adhesive layer includes a reinforcing means selected from the group consisting of steel and net wires.

* * * * *